US007913031B2

(12) United States Patent
Suenaga

(10) Patent No.: US 7,913,031 B2
(45) **Date of Patent: *Mar. 22, 2011**

(54) RECORDING APPARATUS AND RECORDING CONTROL PROGRAM

(75) Inventor: Kazunori Suenaga, Kitakyushu (JP)

(73) Assignee: Seiko Epson Corporation, Tokyo (JP)

( * ) Notice: Subject to any disclaimer, the term of this patent is extended or adjusted under 35 U.S.C. 154(b) by 495 days.

This patent is subject to a terminal disclaimer.

(21) Appl. No.: 11/736,059

(22) Filed: Apr. 17, 2007

(65) Prior Publication Data

US 2007/0245077 A1 Oct. 18, 2007

(30) Foreign Application Priority Data

Apr. 17, 2006 (JP) ................................ 2006-113702

(51) Int. Cl.
*G06F 13/00* (2006.01)

(52) U.S. Cl. .......................... 711/100; 358/1.1; 358/1.6

(58) Field of Classification Search ................. 711/112, 711/100; 358/1.1, 1.6

See application file for complete search history.

(56) References Cited

U.S. PATENT DOCUMENTS

| | | | | |
|---|---|---|---|---|
| 2004/0036895 | A1 * | 2/2004 | Yano et al. | 358/1.6 |
| 2007/0245362 | A1 | 10/2007 | Suenaga | |

FOREIGN PATENT DOCUMENTS

| | | |
|---|---|---|
| JP | 2002-154243 | 5/2002 |
| JP | 2002-237177 | 8/2002 |
| JP | 2003-234859 | 8/2003 |
| JP | 2005-349663 | 12/2005 |
| JP | 2006-041890 | 2/2006 |

OTHER PUBLICATIONS

Office Action U.S. Appl. No. 11/736,060, filed Apr. 2, 2010.

* cited by examiner

*Primary Examiner* — Yong Choe
(74) *Attorney, Agent, or Firm* — Workman Nydegger

(57) ABSTRACT

A recording apparatus includes a recording unit capable of recording an image on a recording medium, a file input device capable of receiving a file from the outside, an external storage unit capable of reading and writing a digital image file, a user interface, and a recording control device that performs file input control through the file input device. The recording control device has a record-execution-operation input function that allows a record execution operation to be performed through the user interface, causing the recording unit to record a selected digital image file on a recording medium; a save-execution-operation input function that causes the external storage unit to store the arbitrarily selected digital image file in a storage medium; and a record/save-execution-operation to be sequentially performed.

4 Claims, 10 Drawing Sheets

50
57
P
57b
53
311
312
31
33
54
34
52
32
322
321
51
62
61
55
56
Y
CD/DVD DRIVE
MEMORY
CARD SLOT
RECORDING
CONTROL UNIT
100
37
36
35

50
100
105
NONVOLATILE MEMORY
101
ROM
102
RAM
SYSTEM BUS
104
MPU
103
ASIC
111
USBIF
106
PF MOTOR DRIVER
58
PF MOTOR
107
CR MOTOR DRIVER
63
CR MOTOR
108
HEAD DRIVER
62
RECORDING HEAD
31
ROTARY ENCODER
32
LINEAR ENCODER
33
SHEET DETECTOR
34
PW SENSOR
35
POWER SWITCH
38
OPERATION/DISPLAY UNIT
36
MEMORY CARD SLOT
37
CD/DVD DRIVE
301
MEMORY CARD
303
DIGITAL CAMERA
302

100
151
SYSTEM CONTROLLER
152
RECORDING-UNIT CONTROLLER
156
INFORMATION STORAGE UNIT
153
FILE SYSTEM
155
UI CONTROLLER (SCREEN DISPLAY, OPERATION INPUT)
154
STILL/MOTION PICTURE CONTROLLER (DECODER)
MEMORY CARD SLOT
36
CD/DVD DRIVE
37
LIQUID CRYSTAL DISPLAY
OPERATION PANEL
381
382
38

RECORDING APPARATUS AND RECORDING CONTROL PROGRAM

The entire disclosure of Japanese Patent Application No. 2006-113702, filed Apr. 17, 2006 is expressly incorporated by reference herein.

BACKGROUND

1. Technical Field

The present invention relates to a recording apparatus including a recording unit capable of recording an image on a recording medium, a file input device capable of receiving a file from the outside, an external storage unit capable of reading and writing a digital image file, and a user interface. The present invention also relates to a recording control program for the recording apparatus.

2. Related Art

Recording apparatuses (e.g., printers) including external storage units, such as hard disc drives, are known (see, for example, JP-A-2005-349663). In such a recording apparatus, generally, a process of recording an image on a recording medium and a process of reading or writing a digital image file by an external storage unit are executed by respective individual operations. For example, if the recording apparatus has a direct print function, a user may operate a user interface included in the recording apparatus to arbitrarily select one or more of a plurality of digital image files stored in a digital camera that is directly connected to the recording apparatus or in a memory card inserted in a memory card slot. After selecting one or more of the digital image files, the user performs a predetermined record execution operation, for example, an operation of pressing a record execution button. Accordingly, direct print control is executed in which images of the selected digital image files are recorded on recording media. Also when the user wishes to store desired digital image files using the external storage unit mounted in the recording apparatus, the user operates the user interface included in the recording apparatus to select one or more of the digital image files stored in the digital camera that is directly connected to the recording apparatus or in the memory card inserted in the memory card slot. After selecting one or more of the desired digital image files, the user performs a predetermined save execution operation, for example, an operation of pressing a save execution button. Accordingly, file save control is performed in which the selected digital image files are stored by the external storage unit.

In the recording apparatus including the external storage unit, such as a hard disc drive, after the user selects the desired digital images from the digital image files stored in the digital camera or in the memory card, the user may wish to execute both the process of recording the images of the desired digital image files on the recording media and the process of storing the desired digital image files by the external storage unit. In the known recording apparatus, as described above, the record execution operation for recording the images on the recording media and the save execution operation for saving the digital image files by the external storage unit are performed independently of each other. Therefore, the operation of selecting the desired digital image files from the digital image files stored in the digital camera or in the memory card must be performed for each of the process of recording the images on the recording media and the process of storing the digital image files by the external storage unit. In other words, in the known recording apparatus including the external storage unit, exactly the same file-selecting operation as that performed for the recording process must be repeated for the file-saving process. Thus, a cumbersome task of repeating the file-selecting operation must be performed.

SUMMARY

An advantage of some aspects of the invention is that usability of a recording apparatus including an external storage unit can be increased.

According to a first aspect of the invention, a recording apparatus includes a recording unit capable of recording an image on a recording medium; a file input device capable of receiving a file from the outside; an external storage unit capable of reading and writing a digital image file; a user interface; and a recording control device that performs file input control through the file input device, control of the external storage unit, recording control for causing the recording unit to record an image on a recording medium, and user interface control through the user interface. The recording control device has a record-execution-operation input function that allows a record execution operation to be performed through the user interface, the record execution operation being performed to execute the recording control for causing the recording unit to record an image of an arbitrarily selected digital image file on a recording medium; a save-execution-operation input function that allows a save execution operation to be performed through the user interface, the save execution operation being performed to execute file save control for causing the external storage unit to store the arbitrarily selected digital image file in a storage medium; and a record/save-execution-operation input function that allows the record execution operation and the save execution operation to be sequentially performed through the user interface, the record execution operation and the save execution operation being performed to execute the recording control for causing the recording unit to record the image of the arbitrarily selected digital image file on the recording medium and the file save control for causing the external storage unit to store the arbitrarily selected digital image file in the storage medium.

The external storage unit refers to all kinds of data storage units other than a main storage unit (main memory) of a computer that can retain data even when the power is not supplied. The external storage unit may be, for example, a data storage unit like a hard disc drive, a CD-RW drive, etc. The term "external" does not mean that the storage unit is externally attached. More specifically, the external storage unit includes all kinds of data storage units of the above-described type irrespective of whether the unit is externally attached to the recording apparatus or mounted in the recording apparatus.

The storage medium stores digital data, such as the digital image file, and includes all kinds of media that stores data by a magnetic method, an optical method, or other kinds of methods.

In the recording apparatus according to the first aspect of the invention, a user can perform the record execution operation for recording the image of the arbitrarily selected digital image file on the recording medium and the save execution operation for causing the external storage unit to store the arbitrarily selected digital image file in the storage medium. In addition, the user can also sequentially perform the record execution operation for recording the image of the arbitrarily selected digital image file on the recording medium and the save execution operation for causing the external storage unit to store the arbitrarily selected digital image file in the storage medium. Therefore, in the case in which both the process of recording the image of the desired digital image file selected by the user on the recording medium and the process of storing the desired digital image file in storage medium are to be performed, it is not necessary for the user to repeat the file-selecting operation for each of the process of recording the image on the recording medium and the process of storing the digital image file in the storage medium.

In the recording apparatus, the user interface may include a record-execution-operation input unit by which the record execution operation is performed to execute the recording control for causing the recording unit to record the image on the recording medium; a save-execution-operation input unit by which the save execution operation is performed to execute the file save control for causing the external storage unit to store the digital image file in the storage medium; and a record/save-execution-operation input unit by which the record execution operation and the save execution operation are sequentially performed to execute the recording control for causing the recording unit to record the image on the recording medium and the file save control for causing the external storage unit to store the digital image file in the storage medium.

Accordingly, after the user arbitrarily selects a desired digital image file, the user can easily select whether to execute only the recording process of recording the image of the desired digital image file, only the storing process of causing the external storage unit to store the desired digital image file, or both the recording process and the storing process. More specifically, the selection can be easily performed simply by selectively operating the record-execution-operation input unit, the save-execution-operation input unit, and the record/save-execution-operation input unit of the user interface.

In addition, the recording control device may have a composite-processing-operation input function that allows two or more operations to be performed through the user interface, the two or more operations being selected from the record execution operation performed to execute the recording control for causing the recording unit to record the image of the arbitrarily selected digital image file on the recording medium, the save execution operation performed to execute the file save control for causing the external storage unit to store the arbitrarily selected digital image file in the storage medium, and an operation performed to execute control based on another function of the recording apparatus.

Accordingly, the user can sequentially perform two or more operations selected from the operation for recording the image of the arbitrarily selected digital image file on the recording medium, the operation for causing the external storage unit to store the arbitrarily selected digital image file, and an operation performed to execute control based on another function of the recording apparatus. Therefore, the usability of the recording apparatus including the external storage unit is further increased.

When the record execution operation for executing the recording control for causing the recording unit to record the image of the arbitrarily selected digital image file on the recording medium and the save execution operation for executing the file save control for causing the external storage unit to store the arbitrarily selected digital image file in the storage medium are sequentially performed, the order in which the recording control and the file save control are executed may be arbitrarily selectable through the user interface.

Accordingly, when the operation for recording the image of the selected digital image file on the recording medium and the operation for causing the external storage unit to store the digital image file are sequentially performed, the order in which the recording control and the file save control are executed can be arbitrarily selected. Therefore, the usability of the recording apparatus including the external storage unit is further increased. For example, whether to execute the recording control for recording the image on the recording medium first, to execute the file save control for causing the external storage unit to store the digital image file first, or to execute both the recording control and the file save control simultaneously can be selected on the basis of the number of selected digital image files, the data volume of each digital image file, the number of copies to be recorded for each digital image file, convenience of the user, etc.

According to a second aspect of the invention, a recording control program is used for a recording apparatus including a recording unit capable of recording an image on a recording medium; a file input device capable of receiving a file from the outside; an external storage unit capable of reading and writing a digital image file; and a user interface. The program causes a computer to perform file input control through the file input device, control of the external storage unit, recording control for causing the recording unit to record an image on a recording medium, and user interface control through the user interface. The program implements a record-execution-operation input function that allows a record execution operation to be performed through the user interface, the record execution operation being performed to execute the recording control for causing the recording unit to record an image of an arbitrarily selected digital image file on a recording medium; a save-execution-operation input function that allows a save execution operation to be performed through the user interface, the save execution operation being performed to execute file save control for causing the external storage unit to store the arbitrarily selected digital image file in a storage medium; and a record/save-execution-operation input function that allows the record execution operation and the save execution operation to be sequentially performed through the user interface, the record execution operation and the save execution operation being performed to execute the recording control for causing the recording unit to record the image of the arbitrarily selected digital image file on the recording medium and the file save control for causing the external storage unit to store the arbitrarily selected digital image file in the storage medium.

Accordingly, any recording apparatus having a computer that can execute the above-described recording control program provides effects similar to those of the recording apparatus according to the first aspect of the invention.

BRIEF DESCRIPTION OF THE DRAWINGS

The invention will be described with reference to the accompanying drawings, wherein like numbers reference like elements.

FIG. 6 is a flowchart illustrating a control procedure corresponding to an operation of a PRINT button and the like.

DESCRIPTION OF EXEMPLARY EMBODIMENTS

Embodiments of the invention will be described below with reference to the accompanying drawings.

First, the schematic structure of an ink jet recording apparatus will be described below as a recording apparatus according to an embodiment of the invention.

Figure 1:
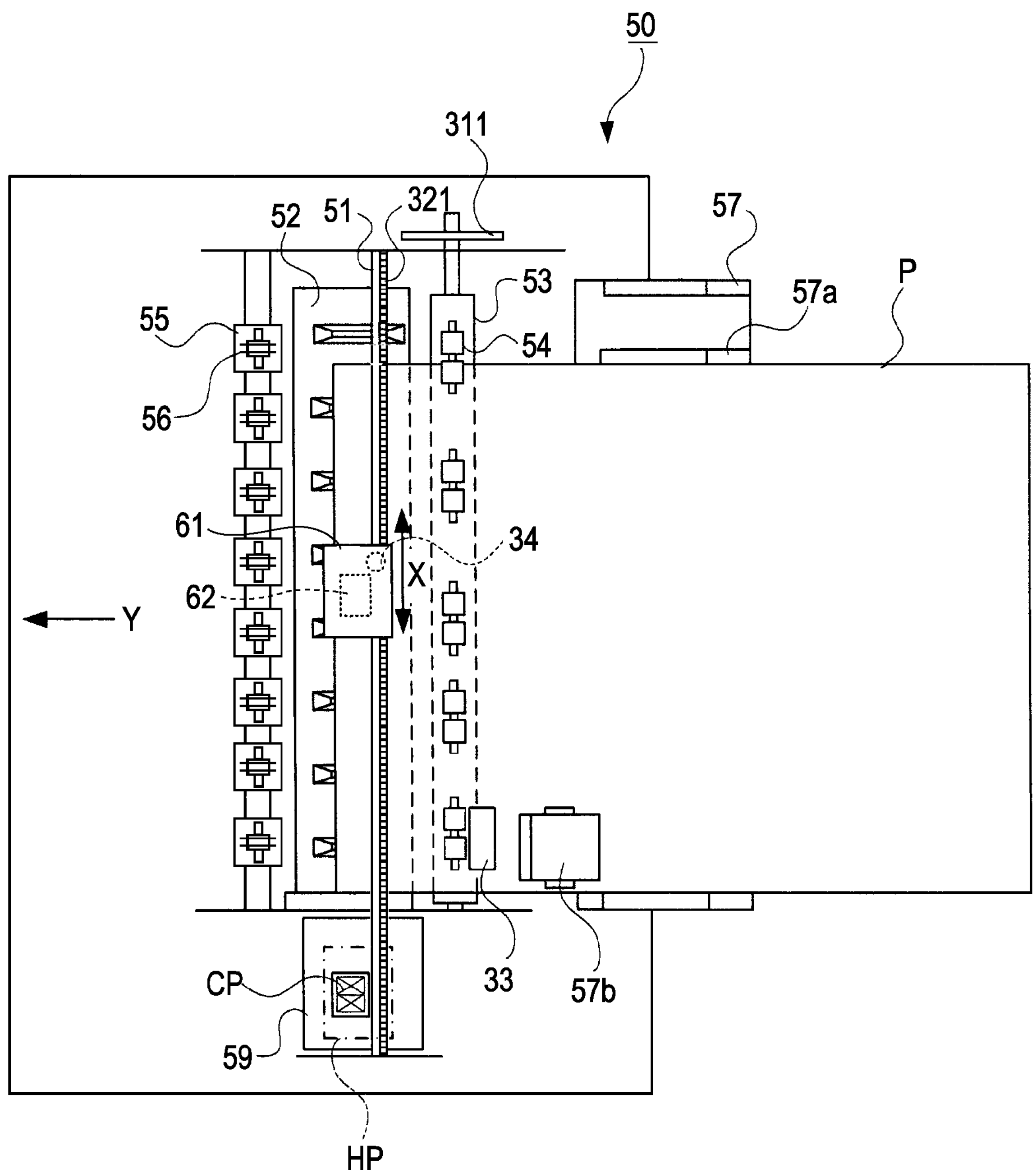
FIG. 1 is a schematic plan view of an ink jet recording apparatus according to an embodiment of the invention.
Figure 2:
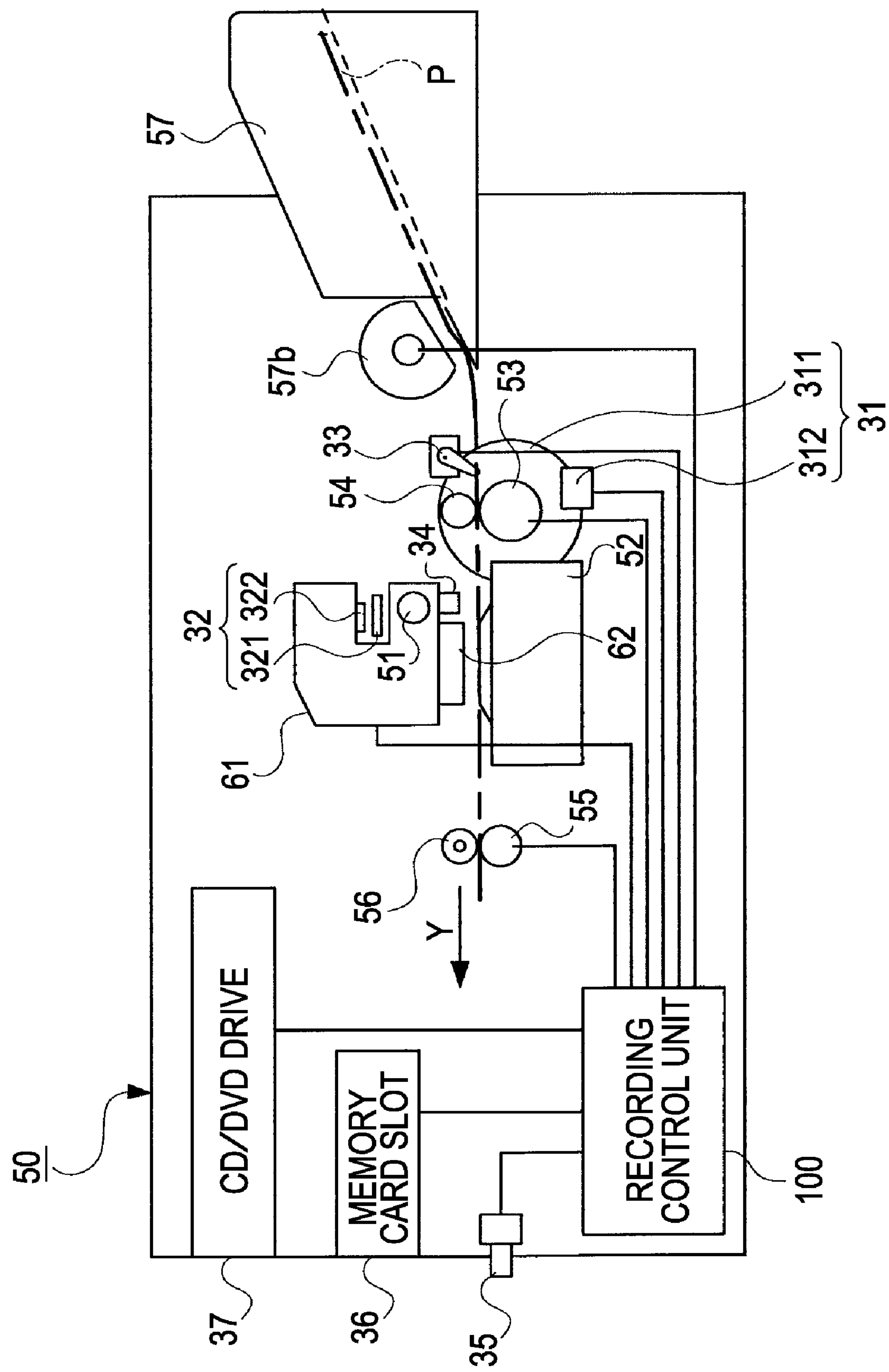
FIG. 2 is a schematic side view of the ink jet recording apparatus.
Figure 3:
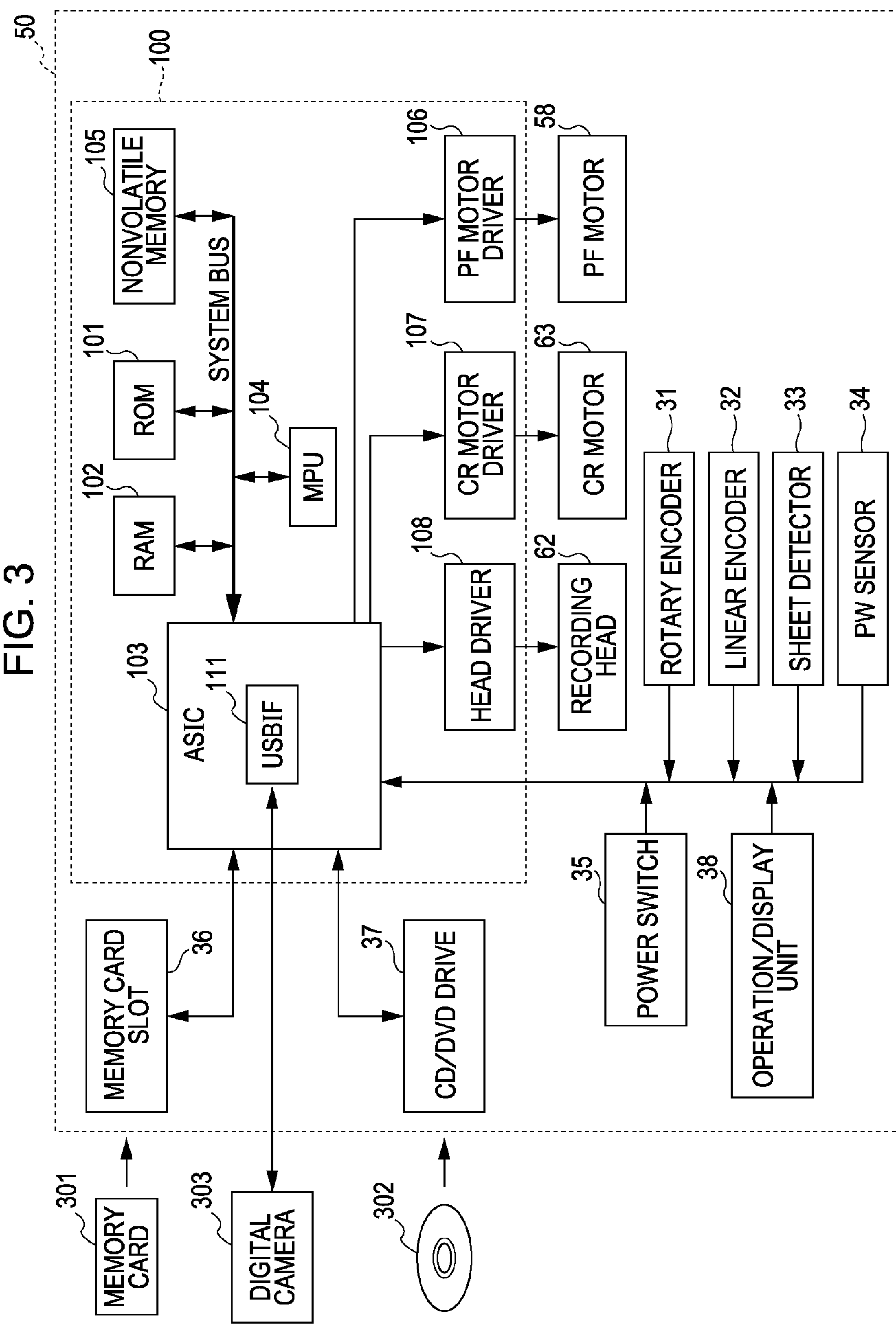
FIG. 3 is a schematic block diagram of the ink jet recording apparatus.

FIG. 1 and FIG. 2 are a plan view and a side view, respectively, illustrating the main part of an ink jet recording apparatus 50 according to an embodiment of the invention. FIG. 3 is a schematic block diagram illustrating the ink jet recording apparatus 50.

The ink jet recording apparatus 50 includes a recording unit capable of recording an image on a recording sheet P that functions as a recording medium. The recording unit includes a carriage 61 supported by a carriage guide shaft 51 such that the carriage 61 can move in a main scanning direction X with respect to the recording sheet P. The carriage 61 carries a recording head 62 for forming dots on a recording surface of the recording sheet P to record an image thereon and a PW sensor 34 for detecting an edge of the recording sheet P in the main scanning direction X. The carriage 61 receives a rotational driving force of a CR motor 63 (see FIG. 3) that functions as a carriage motor via a belt transmission mechanism (not shown) including an endless belt, and thereby reciprocates in the main scanning direction X. When the carriage 61 reciprocates in the main scanning direction X, the recording head 62 also reciprocates in the main scanning direction X with respect to the recording sheet P. A platen 52 that supports the recording sheet P such that the recording surface of the recording sheet P and a head surface of the recording head 62 are spaced from each other by a predetermined distance is disposed so as to face the head surface of the recording head 62.

A known capping device 59 is provided at one end of a reciprocating stroke of the carriage 61 in the main scanning direction X. In a standby state in which recording is not performed, the carriage 61 is moved to a position above the capping device 59 and the head surface of the recording head 62 is sealed with a cap CP included in the capping device 59. This position of the carriage 61 is defined as a home position HP.

In the ink jet recording apparatus 50, the recording unit capable of recording the image on the recording sheet P also includes a recording-medium-transporting unit. The recording-medium-transporting unit includes a transport driving roller 53 and a plurality of transport driven rollers 54 for transporting the recording sheet P in a sub-scanning direction Y. The transport driving roller 53 is rotated by a rotational driving force transmitted from a PF motor (see FIG. 3), which functions as a recording-medium transporting motor, through a gear mechanism. The transport driven rollers 54 are in pressure contact with the transport driving roller 53, and are supported such that the transport driven rollers 54 can be rotated by the rotation of the transport driving roller 53. The transport driving roller 53 has a high-frictional-resistance film provided over an outer peripheral surface thereof, and the recording sheet P is pressed against the outer peripheral surface of the transport driving roller 53 by a pressing force applied by the transport driven rollers 54. Accordingly, the recording sheet P is in close contact with the outer peripheral surface of the transport driving roller 53 due to the frictional resistance thereof. In this state, when the transport driving roller 53 is rotated in a transporting direction, the transport driven rollers 54 are rotated by the rotation of the transport driving roller 53 and the recording sheet P is transported in the sub-scanning direction Y. Thus, the recording head 62 is moved with respect to the recording head 62 in the sub-scanning direction Y.

A plurality of recording sheets P are stacked on a paper feed tray 57, and an automatic sheet feeder (ASF) for automatically feeding the uppermost recording sheet P to the recording-medium-transporting unit is placed near the paper feed tray 57. The ASF has a known structure including a feed roller **57*b* provided on the paper feed tray 57 and a separating pad (not shown). The feed roller 57*b* is positioned near one side of the paper feed tray 57. A recording sheet guide 57*a* is provided on the paper feed tray 57 such that the recording sheet guide 57*a* can slide in the width direction in accordance with the width of the recording sheets P. The uppermost recording sheet P on the paper feed tray 57 is fed by the feed roller 57*b* that is rotated by a rotational driving force transmitted from the PF motor 58 (FIG. 3) through a gear mechanism. Due to the frictional resistance of the separating pad, the recording sheets P are reliably fed one at a time from the top, and are prevented from being fed together. A known sheet detector 33 for detecting the leading and trailing edges of the recording sheet P is disposed between the feed roller 57*b* and the transport driving roller 53**.

The recording-medium-transporting unit for transporting the recording sheet P in the sub-scanning direction Y also includes ejection driving rollers 55 and ejection driven rollers 56, which also serve to eject the recording sheet P after the recording process. The ejection driving rollers 55 are rotated by a rotational driving force transmitted from the PF motor 58 (see FIG. 3) through a gear mechanism. After the recording process, the recording sheet P is ejected in the sub-scanning direction Y by the rotation of the ejection driving rollers 55. Each of the ejection driven rollers 56 has a plurality of pointed teeth along the periphery thereof, each tooth coming into point-contact with the recording surface of the recording sheet P. The ejection driven rollers 56 are individually pressed against the corresponding ejection driving rollers 55. When the recording sheet P is ejected by the rotation of the ejection driving rollers 55, the ejection driven rollers 56 come into contact with the recording sheet P and are rotated as the recording sheet P is ejected.

The PF motor 58 (see FIG. 3) for driving the feed roller **57*b*, the transport driving roller 53, and the ejection driving rollers 55 and the CR motor 63 (see FIG. 3) for driving the carriage 61 in the main scanning direction X are driven and controlled by a recording control unit 100. The recording head 62 is also driven and controlled by the recording control unit 100 so as to discharge ink toward the surface of the recording sheet P. The recording control unit 100 alternately executes an operation of causing the recording head 62 to discharge ink toward the recording sheet P so as to form dots thereon while reciprocating the carriage 61** in the main scanning direction X and an operation of transporting the recording sheet P in the sub-scanning direction Y by a predetermined distance. Thus, the recording control for recording an image on the recording sheet P is performed.

The recording control unit 100 will be described below with reference to FIGS. 1 to 3.

The recording control unit 100 includes a read only memory (ROM) 101, a random access memory (RAM) 102, an application-specific integrated circuit (ASIC) 103, a microprocessor unit (MPU) 104, a nonvolatile memory 105 that functions as a nonvolatile storage medium, a PF motor driver 106 that functions as a recording-medium-transporting motor driving circuit, a CR motor driver 107 that functions as a carriage motor driving circuit, and a head driver 108. The MPU 104 receives output signals from a rotary encoder 31, a linear encoder 32, a sheet detector 33, a PW sensor 34, and a power switch 35 via the ASIC 103. The power switch 35 is used for turning on and off the power of the ink jet recording apparatus 50.

The rotary encoder 31 has a known structure and is configured to output a pulse signal with a period associated with a rotation period of the PF motor 58. Accordingly, the amount of rotation of the transport driving roller 53 can be detected. The rotary encoder 31 includes a rotary scale 311 that rotates in association with the rotation of the transport driving roller 53 and a rotary scale sensor 312 for detecting slits formed along the periphery of the rotary scale 311 with constant intervals (see FIG. 2). The output signal from the rotary scale sensor 312 varies as the transport driving roller 53 rotates, and is output to the MPU 104 via the ASIC 103.

The linear encoder 32 has a known structure and is configured to output a pulse signal with a period associated with a rotation period of the CR motor 63. Accordingly, the amount of movement of the carriage 61 can be detected. The linear encoder 32 includes a linear scale 321 disposed substantially parallel to the main scanning direction X at a position near the carriage 61 and a linear scale sensor 322 mounted on the carriage 61 for detecting slits formed in the linear scale 321 at constant intervals (see FIG. 2). The output signal from the linear scale sensor 322 has a number of pulses that corresponds to the amount of movement of the carriage 61 in the main scanning direction X and a pulse period that varies in accordance with the moving speed of the carriage 61. The output signal from the linear scale sensor 322 is fed to the MPU 104 via the ASIC 103.

A system bus of the recording control unit 100 is connected to the ROM 101, the RAM 102, the ASIC 103, the MPU 104, and the nonvolatile memory 105. The MPU 104 performs various processes for executing the recording control of the ink jet recording apparatus 50 and other kinds of processes as necessary. The ROM 101 stores a recording control program (firmware) necessary for controlling the ink jet recording apparatus 50 with the MPU 104. Various data necessary for executing the recording control program are stored in the nonvolatile memory 105. The RAM 102 is used as a work area for the MPU 104 and a storage area for the recording data.

The ASIC 103 includes a control circuit for controlling the speed of the PF motor 58, which is a DC motor, a control circuit for controlling the speed of the CR motor 63, and a control circuit for driving and controlling the recording head 62, all of which are not shown in the figures. The ASIC 103 performs various calculations for the speed control of the PF motor 58 and the CR motor 63 on the basis of a control command transmitted from the MPU 104, the output signal from the rotary encoder 31, and the output signal from the linear encoder 32. Then, the ASIC 103 outputs motor control signals obtained as a result of the calculations to the PF motor driver 106 and the CR motor driver 107. In addition, the ASIC 103 generates a control signal for the recording head 62 on the basis of recording data output from the MPU 104 and outputs the control signal to the head driver 108, thereby driving and controlling the recording head 62.

The ASIC 103 also includes an USB interface (USBIF) 111 that is connected to a digital camera 303 via a USB connector (not shown) provided on the main body of the ink jet recording apparatus 50. The USBIF 111 has a function as a file input device capable of receiving a digital image file from the digital camera 303 or the like. The above-described direct printing can be performed in the state in which the digital camera 303 is connected to the ink jet recording apparatus 50 through the USBIF 111.

The ink jet recording apparatus 50 also includes a memory card slot 36 through which data can be read from a memory card 301. The memory card slot 36 also has a function as the file input device capable of receiving a digital image file from the outside. The ink jet recording apparatus 50 further includes a CD/DVD drive 37 that functions as an external storage unit capable of reading and writing data, such as a digital image file, from/to an optical disc 302, such as a compact disk (CD) and a digital versatile disk (DVD). The process of controlling the memory card slot 36 and the data input/output process of the CD/DVD drive 37 are performed by the MPU 104 through the ASIC 103. The file input device is not limited to the USBIF 111 or the memory card slot 36. For example, the ink jet recording apparatus 50 may also have a device for receiving files via network, such as the Internet.

Figure 4:
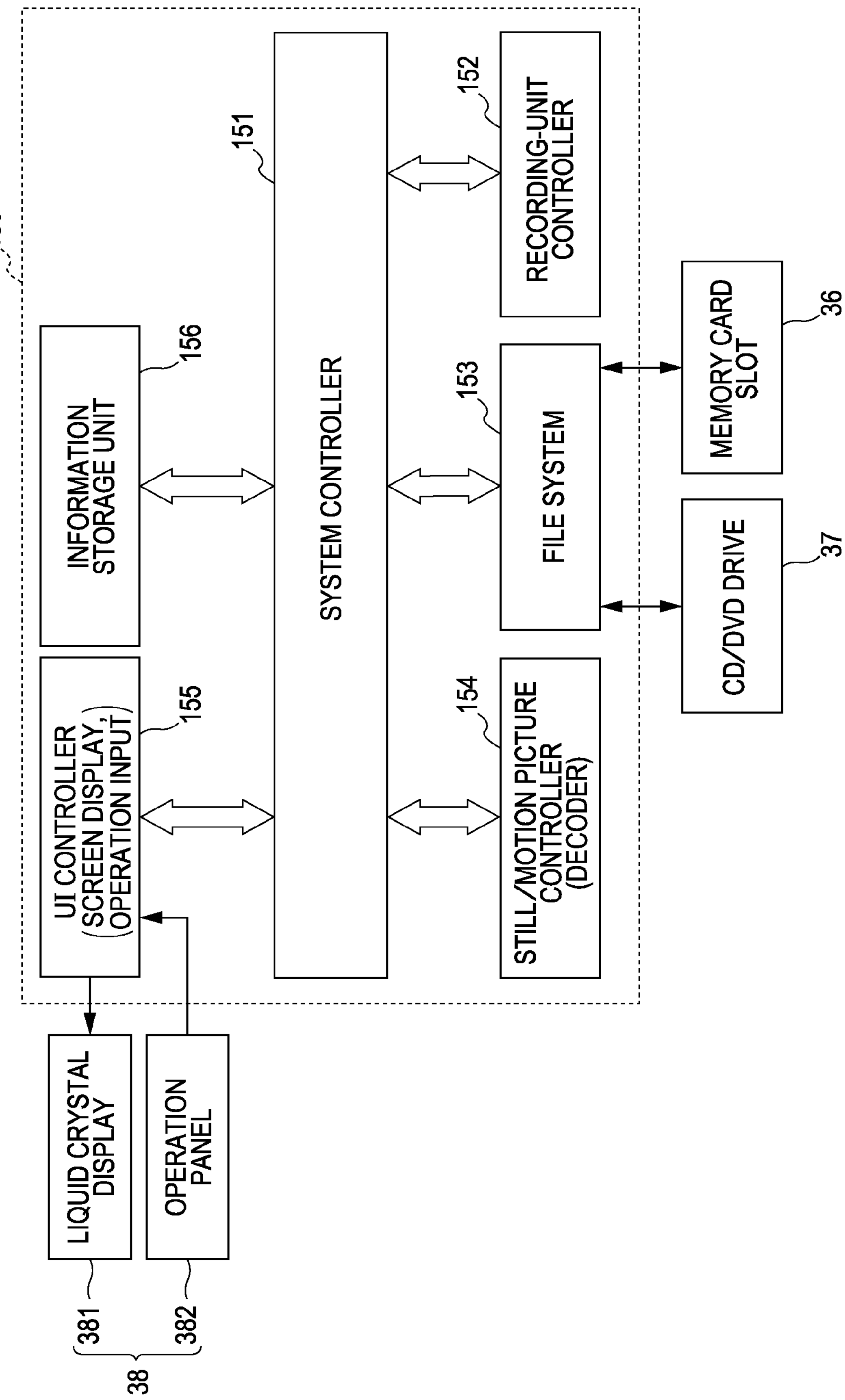
FIG. 4 is a functional block diagram of the main part of a recording control unit.

FIG. 4 is a functional block diagram illustrating the main part of the recording control unit 100.

The recording control unit 100 functions as a recording control device and includes a system controller 151, a recording-unit controller 152, a file system 153, a still/motion picture controller 154, a user interface (UI) controller 155, and an information storage unit 156 as functional blocks.

The recording-unit controller 152 executes the above-described recording control and causes the recording unit to record an image on the recording sheet P. The file system 153 performs file input/output control through the memory card slot 36 or the CD/DVD drive 37. The still/motion picture controller 154 performs decoding of the compressed digital still-image files and digital motion-picture files. The decoded digital images or digital motion pictures can be played back and on a liquid crystal display 381. The UI controller 155 performs operation input control and screen display control for a user interface 38 provided on the main body of the ink jet recording apparatus 50. The user interface 38 includes the liquid crystal display 381 that functions as a display unit and an operation panel 382 that functions as an operation input unit. The information storage unit 156 has a function of generating and storing a list of jobs to be performed by the ink jet recording apparatus 50.

By operating the user interface 38, a user can arbitrarily select a plurality of digital image files from digital image files that are stored in the digital camera 303 and that can be input through the USBIF 111 or from digital image files that are stored in the memory card 301 and that can be input through the memory card slot 36. The system controller 151 has a record-execution-operation input function for allowing a record execution operation to be performed through the user interface 38. The record execution operation is performed to execute the recording control for recording images of the arbitrarily selected digital image files on the recording sheets P. In addition, the system controller 151 also has a save-execution-operation input function for allowing a save execution operation to be performed through the user interface 38. The save execution operation is performed to execute the file save control for storing the arbitrarily selected digital image files in the optical disc 302 using the CD/DVD drive 37.

The system controller 151 also has a record/save-execution-operation input function for allowing the record execution operation and the save execution operation to be sequentially performed through the user interface 38 so as to execute both the recording control for recording the images of the arbitrarily selected digital image files on the recording sheets P and the file save control for storing the arbitrarily selected digital image files in the optical disc 302 using the CD/DVD drive 37.

Figure 5:
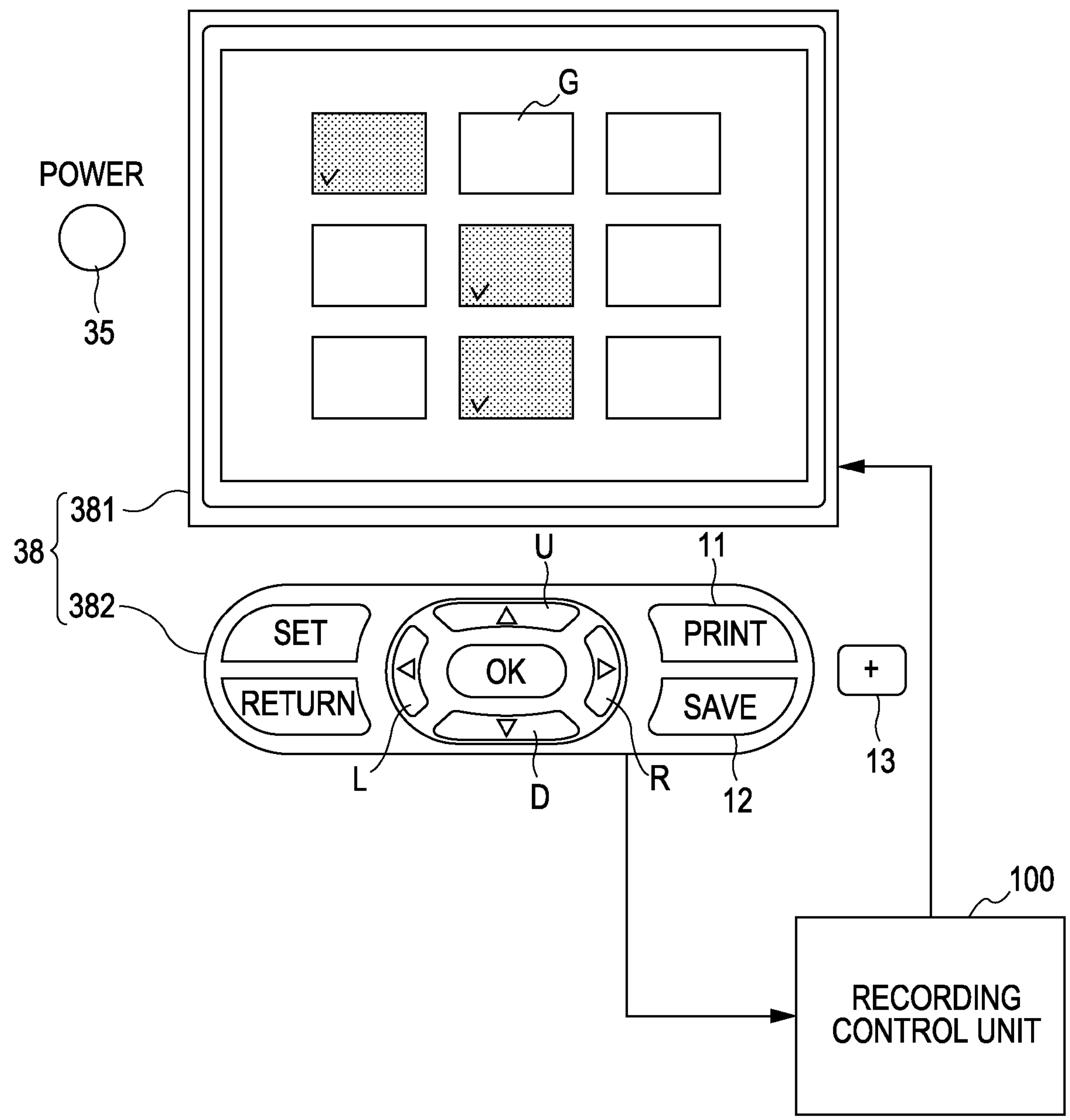
FIG. 5 illustrates a user interface according to a first embodiment of the invention.

FIG. 5 is a schematic plan view of the user interface 38 according to a first embodiment of the invention.

The operation panel 382 and the power switch 35 are arranged in a region near the liquid crystal display 381. The operation panel 382 has an up button U, a down button D, a left button L, and a right button R for moving a cursor upward, downward, leftward, and rightward, respectively, on a screen of the liquid crystal display 381 and for increasing or reducing the number of copies to be printed (recorded). In addition, as shown in FIG. 5, the operation panel 382 also has a SET button, a RETURN button, and an OK button. The user operates these buttons to select arbitrary images G on the screen of the liquid crystal display 381. The selected images are indicated by check marks, as shown in FIG. 5. Accordingly, the images to be recorded on the recording sheets P and the digital image files to be stored in the optical disc 302 can be arbitrarily selected.

The operation panel 382 further includes a PRINT button 11, a SAVE button 12, and a "+" button 13. The PRINT button 11 functions as a record-execution-operation input unit and allows the user to perform an operation for executing the recording control in which the images of the arbitrarily selected digital image files are recorded on the recording sheets P. The SAVE button 12 functions as a save-execution-operation input unit and allows the user to perform an operation for executing the file save control in which the arbitrarily selected digital image files are stored in the optical disc 302 by the CD/DVD drive 37. The "+" button 13 functions as a record/save-execution-operation input unit and allows the user to sequentially perform the operation for executing the recording control in which the images of the arbitrarily selected digital image files are recorded on the recording sheets P and the operation for executing the file save control in which the arbitrarily selected digital image files are stored in the optical disc 302 by the CD/DVD drive 37.

A control procedure performed by the recording control unit 100 in response to the operation of the PRINT button 11, the SAVE button 12, and the "+" button 13 will be described below.

Figure 6:
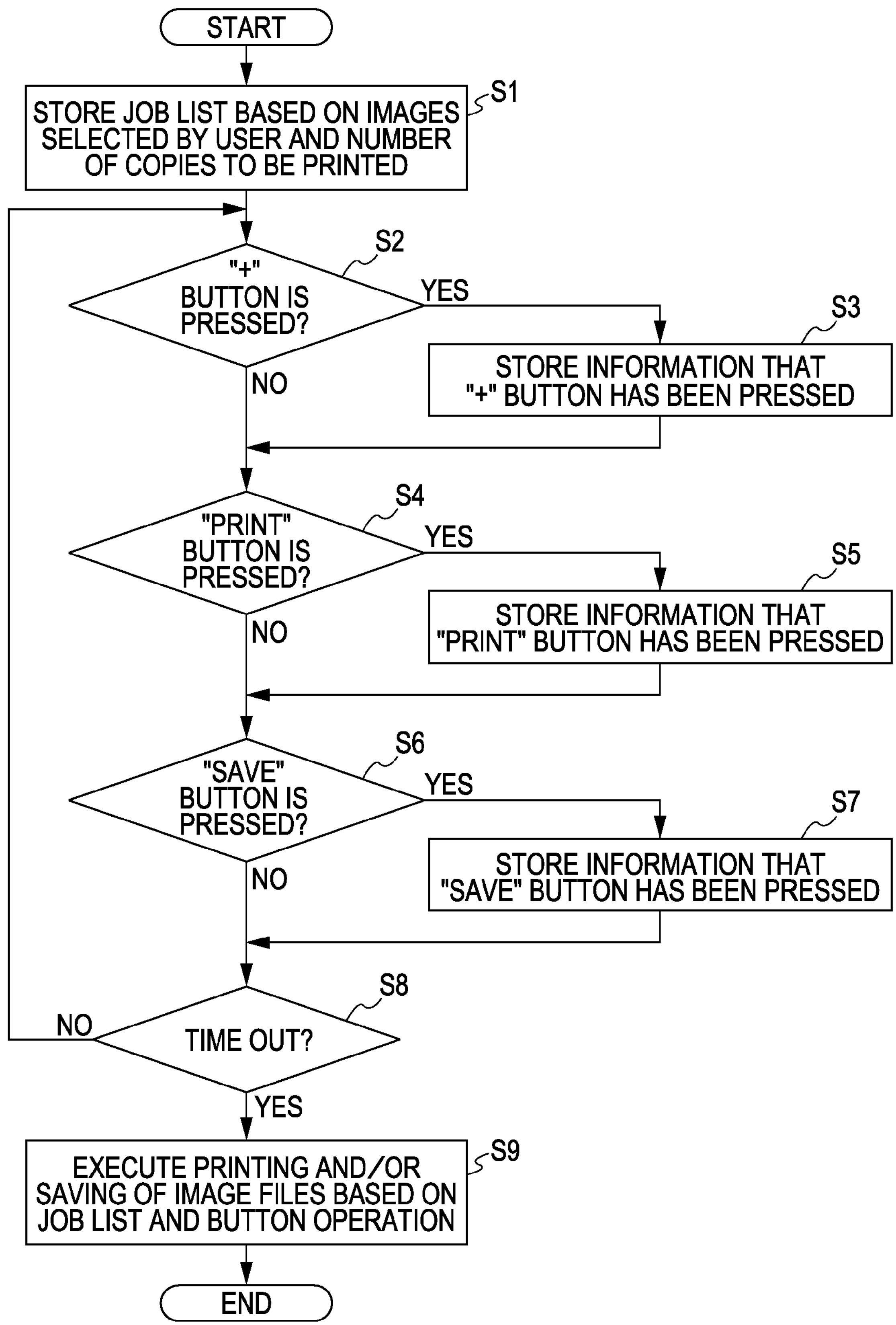

FIG. 6 is a flowchart illustrating the control procedure performed by the recording control unit 100 in response to the operation of the PRINT button 11, the SAVE button 12, and the "+" button 13.

When the user operates the user interface 38 so as to arbitrarily select a plurality of digital image files from files stored in the digital camera 303 or in the memory card 301, a JOB list based on the selected images and the number of copies to be printed (recorded) for each of the selected images is generated and stored (Step S1). The JOB list is updated each time the user changes the selected images or the number of copies to be printed (recorded). Then, it is determined whether or not the "+" button 13 is pressed (Step S2). If the "+" button 13 is pressed (Yes in Step S2) information indicating that the "+" button 13 has been pressed is stored (Step S3). If the "+" button 13 is not pressed (No in Step S2), it is determined whether or not the PRINT button 11 is pressed (Step S4).

If the PRINT button 11 is pressed (Yes in Step S4) information indicating that the PRINT button 11 has been pressed is stored (Step S5). If the PRINT button 11 is not pressed (No in Step S4), it is determined whether or not the SAVE button 12 is pressed (Step S6). If the SAVE button 12 is pressed (Yes in Step S6), information indicating that the SAVE button 12 has been pressed is stored (Step S7). If the SAVE button 12 is not pressed (No in Step S6), it is determined whether or not a predetermined time has elapsed without any button being pressed by the user, that is, whether or not a timeout has occurred (Step S8). If any one of the buttons is pressed by the user before the timeout (No in Step S8), the process returns to Step S2 and continues the process until the timeout occurs (Yes in Step S8). Then, control corresponding to the contents of the JOB list and the button operation information of the PRINT button 11, the SAVE button 12, and the "+" button 13 is performed (Step S9).

In the case in which only the PRINT button 11 has been pressed, the recording control unit 100 performs the recording control on the basis of the contents of the JOB list. More specifically, the set number of copies are printed (recorded) on the recording sheets P for each of the images arbitrarily selected by the user. In the case in which only the SAVE button 12 has been pressed, the recording control unit 100 performs the file save control on the basis of the contents of the JOB list. More specifically, the digital image files arbitrarily selected by the user are stored in the optical disc 302 by the CD/DVD drive 37. In the case in which the PRINT button 11, the SAVE button 12, and the "+" button 13 have all been pressed, the recording control for recording the images of the arbitrarily selected digital image files on the recording sheets P and the file save control for saving the arbitrarily selected digital image files in the optical disc 302 are both performed on the basis of the contents of the JOB list. In this case, the buttons are operated in the order of "PRINT"→"+"→"SAVE" or in the order of "SAVE"→"+"→"PRINT".

The order in which the recording control for recording the images on the recording sheets P and the file save control for storing the digital image files in the optical disc 302 may be selected depending on whether the PRINT button 11 has been pressed first or the SAVE button 12 has been pressed first. Alternatively, the order in which the recording control and the file save control are performed may be set through the setup screen in advance. For example, whether to execute the recording control for recording the images on the recording sheets P first, to execute the file save control for storing the digital image files in the optical disc 302 by the CD/DVD drive 37 first, or to execute both the recording control and the file save control simultaneously can be determined on the basis of the number of the selected digital image files, the data volume of each digital image file, the number of copies to be recorded for each digital image file, convenience of the user, etc. In the case in which both the recording control and the file save control are performed simultaneously, the control timing may be set such that the recording control for recording the images on the recording sheets P and the file save control for storing the digital image files in the optical disc 302 can be finished at the same time. If the combination of buttons different from the above-described combination is stored as the button operation information, a message prompting the user to perform a button operation again is displayed on the liquid crystal display 381.

Figure 7:
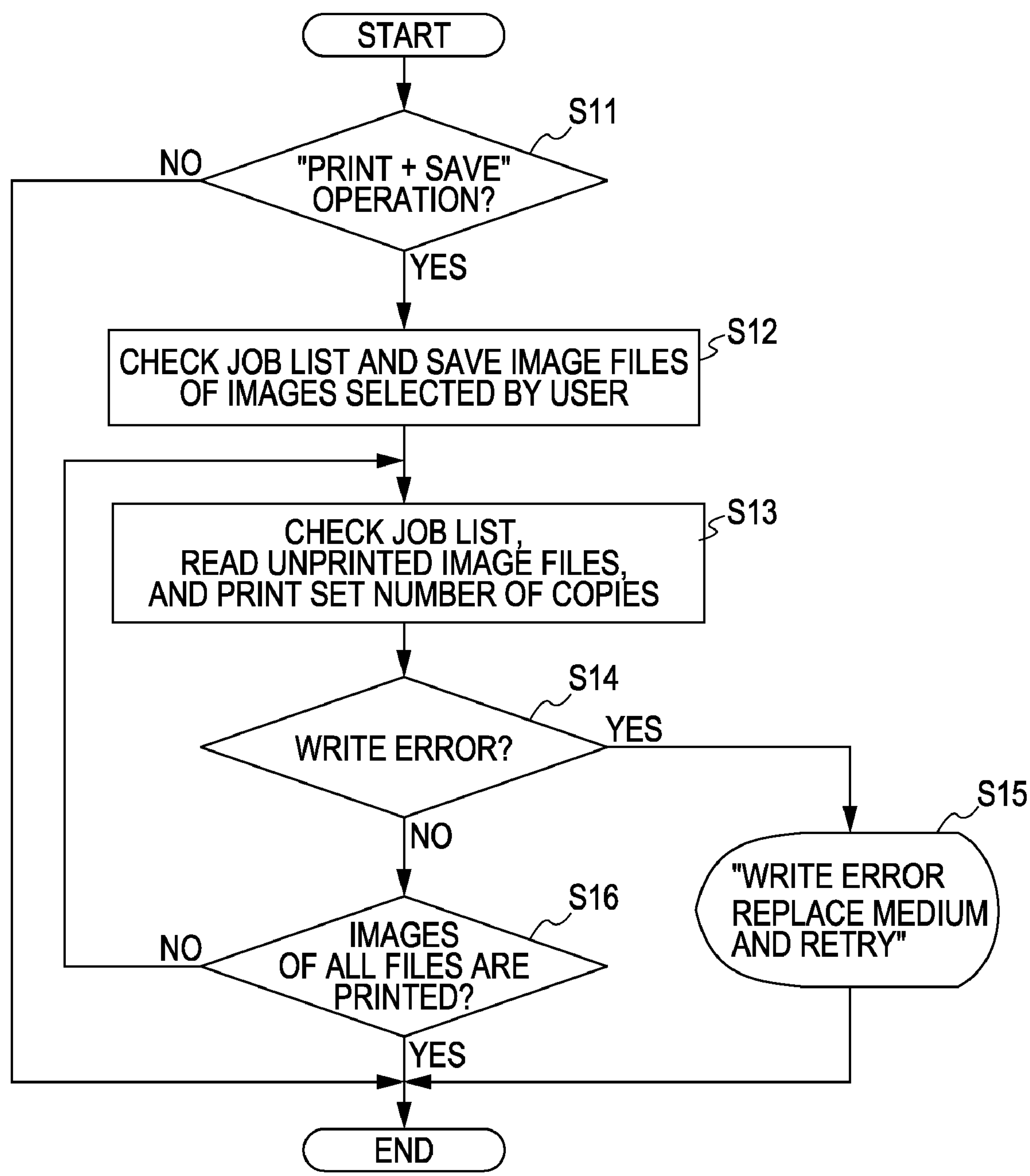
FIG. 7 is a flowchart illustrating a control procedure of recording control and file save control.

FIG. 7 is a flowchart showing a procedure for performing both the recording control for recording the images of the digital image files that are arbitrarily selected by the user on the recording sheets P and the file save control for storing the digital image files in the optical disc 302. This procedure is performed in Step S9 in the flowchart shown in FIG. 6.

First, it is determined whether or not a "print+save" operation has been performed (Step S11). That is, it is determined whether or not the buttons are operated in the order of "PRINT"→"+"→"SAVE" or in the order of "SAVE"→"+"→"PRINT". If the "print+save" operation has not been performed (No in Step S11), the procedure is finished. This means either only the PRINT button 11 has been pressed, only the SAVE button 12 has been pressed, or it is necessary to request the user to perform the button operation again.

If the "print+save" operation has been performed (Yes in Step S11), the JOB list stored in the information storage unit 156 is checked to determine the digital image files corresponding to the images selected by the user. Then, the CD/DVD drive 37 is caused to store all of the digital image files corresponding to the images selected by the user in the optical disc 302 in the CD/DVD drive 37 (Step S12). After all of the digital image files are stored in the optical disc 302, the JOB list is checked again to determine the digital image files corresponding to the images that are not yet printed (recorded). Then, one of the digital image files corresponding to the images that are not yet printed (recorded) is read from the optical disc 302, and the set number of copies of the image is printed (recorded) (Step S13). At this time, it is determined whether or not a read error has occurred in the process of reading the digital image file from the optical disc 302 (Step S14). If it is determined that a read error has occurred (Yes in Step S14) it is determined that a write error has occurred in the process of writing the digital image file in the optical disc 302 in Step S12. Accordingly, an error message is displayed on the liquid crystal display 381 (Step S15). The error message may be, for example, "Write error. Please replace the medium (optical disc 302) and retry."

If the number of copies of the image of the digital image file is finished without write errors (No in Step S14), the JOB list is updated so that the digital image file is set to a printed (recorded) state. Then, the JOB list is checked again to determine whether or not all of the selected images are recorded on the recording sheets P (Step S16). If there are one or more selected images that are not yet recorded (No in Step S16), the process returns to Step S13. In Step S13, the digital image files corresponding the images that are not yet printed (recorded) are determined on the basis of the contents of the JOB list, one of the determined digital image files is read from the optical disc 302, and the set number of copies of the corresponding image are recorded on the recording sheets P. Then, when all of the selected images are recorded (Yes in Step S16), the procedure is finished.

As described above, first, the user arbitrarily selects one or more of a plurality of digital image files stored in the digital camera 303 or in the memory card 301. Then, the user can sequentially perform the operation for recording the images of the selected digital image files on the recording sheets P and the operation for causing the CD/DVD drive 37 to store the arbitrarily selected digital image files in the optical disc 302 by operating the buttons in the order of "PRINT"→"+"→"SAVE" or "SAVE"→"+"→"PRINT". Accordingly, the user can execute both the process for recording the images of the desired digital image files on the recording sheets P and the process for storing the digital image files in the optical disc 302 without repeating the file-selecting operation. More specifically, in the process of causing the CD/DVD drive 37 to store the digital image files in the optical disc 302, it is not necessary for the user to repeat exactly the same file-selecting operation as that performed in the process of recording the images on the recording sheets P. If the user wishes only to record the images of the selected digital image files on the recording sheets P, the user presses only the PRINT button 11. If the user wishes only to store the digital image files in the optical disc 302, the user presses only the SAVE button 12.

Thus, the usability of the ink jet recording apparatus 50 including the external storage unit, such as the CD/DVD drive 37, is increased.

When the user presses the buttons in the order of "PRINT"→"+"→"SAVE" or "SAVE"→"+"→"PRINT" after selecting one or more of the digital image files stored in the digital camera 303 or the memory card 301, the recording control for recording the images on the recording sheet P and the file save control for causing the CD/DVD drive 37 to store the digital image files in the optical disc 302 are performed in a mutually exclusive manner. For example, the recording control is performed after the file save control, as in the procedure shown in the flowchart of FIG. 7. Thus, the recording control for recording the images on the recording sheets P and the file save control for causing the CD/DVD drive 37 to store the digital image files in the optical disc 302 are not performed simultaneously. Therefore, vibration generated due to the automatic sheet-feeding operation performed by the ASF and due to the reciprocating operation of the carriage 61 in the process of recording the images on the recording sheet P and vibration generated due to the rotation of the optical disc 302 in the CD/DVD drive 37 in the process of storing the digital image files are prevented from influencing each other. As a result, reduction in the quality of the images recorded on the recording sheets P and occurrence of write errors in the CD/DVD drive 37 caused by the influence between the vibration generated during the recording control and the vibration generated during the file save control can be prevented at low cost without providing a vibration detector, a vibration reducing mechanism, etc.

In the above-described procedure, first, the CD/DVD drive 37 is caused to store all of the digital image files corresponding to the images selected by the user in the optical disc 302. Then, the digital image files stored in the optical disc 302 are read to record the images of the digital image files on the recording sheets P. Therefore, if a write error occurs in the process of storing the digital image files in the optical disc 302, the error can be quickly detected. In other words, because the file save control for causing the CD/DVD drive 37 to store the digital image files in the optical disc 302 is performed first and then the digital image files stored in the optical disc 302 are read to perform the recording control for recording the images of the digital image files on the recording sheets P, whether or not the process of storing the digital image files has been normally performed can be checked in the process of recording the images on the recording sheet P.

User interfaces included in ink jet recording apparatuses according to other embodiments of the invention will be described below.

Figure 8:
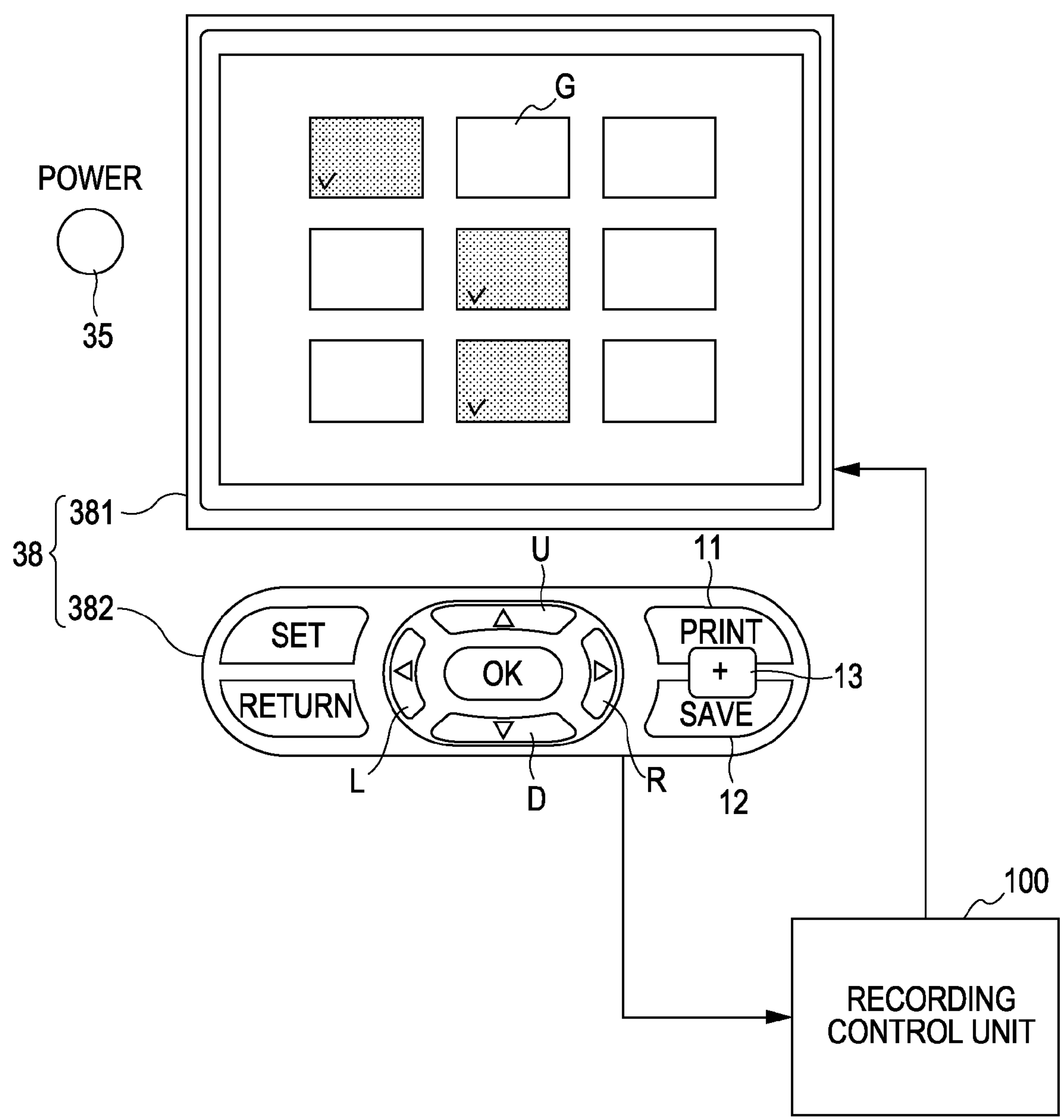
FIG. 8 illustrates a user interface according to a second embodiment of the invention.

FIG. 8 is a schematic plan view of a user interface 38 according to a second embodiment of the invention.

In the second embodiment, as shown in FIG. 8, a "+" button 13 is arranged so as to extend between a PRINT button 11 and a SAVE button 12. The PRINT button 11 and the SAVE button 12 can be individually pressed. In addition, when the "+" button 13 is pressed, the PRINT button 11 and the SAVE button 12 are pressed together with the "+" button 13. In other words, the user can operate all of the PRINT button 11, the SAVE button 12, and the "+" button 13 simultaneously simply by pressing the "+" button 13. Accordingly, both the process of recording the images of the desired digital image files selected by the user on the recording sheets P and the process of storing the desired digital image files in the optical disc 302 can be performed.

Figure 9:
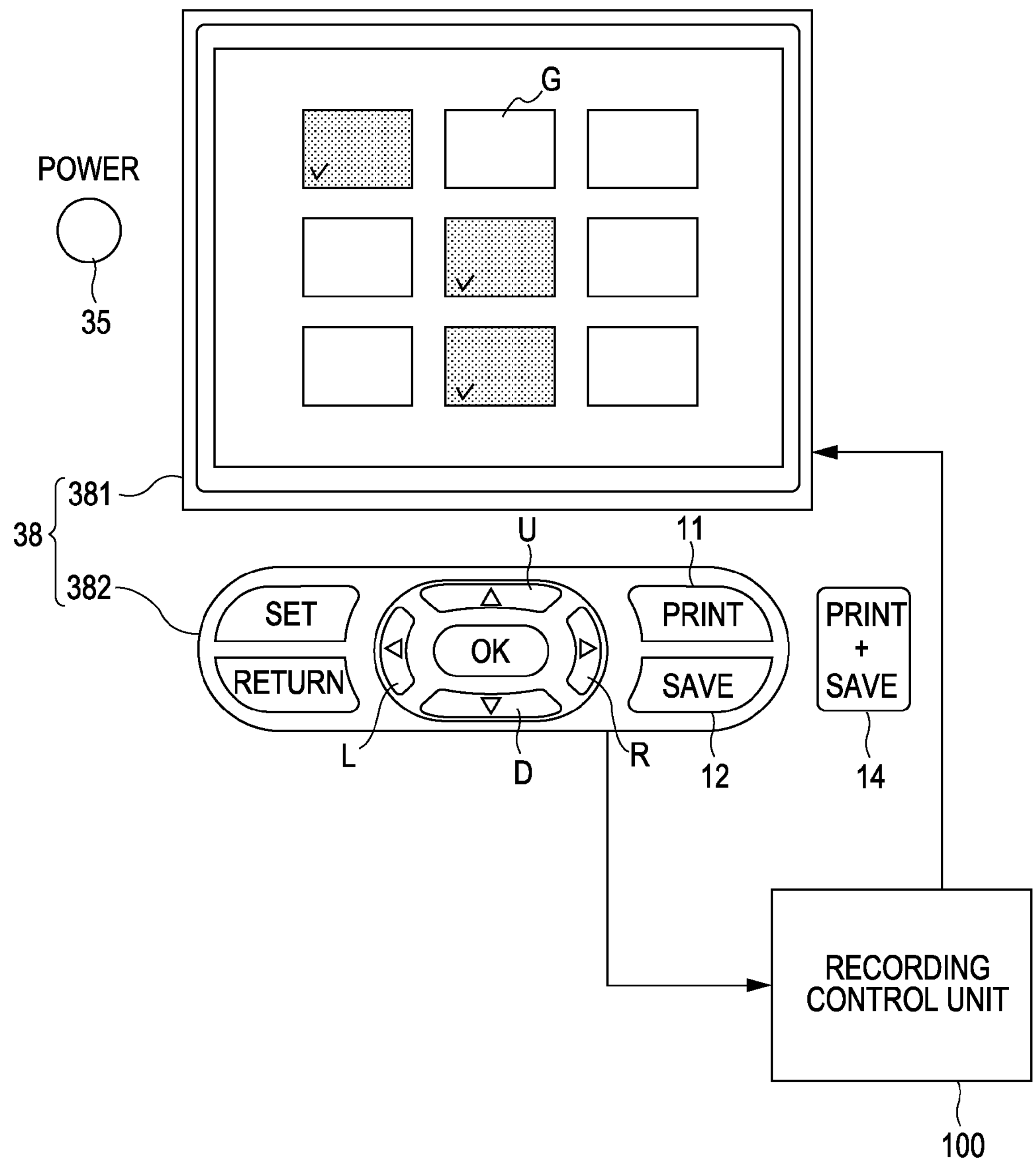
FIG. 9 illustrates a user interface according to a third embodiment of the invention.

FIG. 9 is a plan view of a user interface 38 according to a third embodiment of the invention.

As shown in FIG. 9, instead of the "+" button 13 described in the first and second embodiments, a "PRINT+SAVE" button 14 may be provided exclusively for the "print+save" operation. In the third embodiment, when the user presses the "PRINT+SAVE" button 14, both the process of recording the images of the desired digital image files selected by the user on the recording sheets P and the process of storing the desired digital image files in the optical disc 302 are performed.

Figure 10:
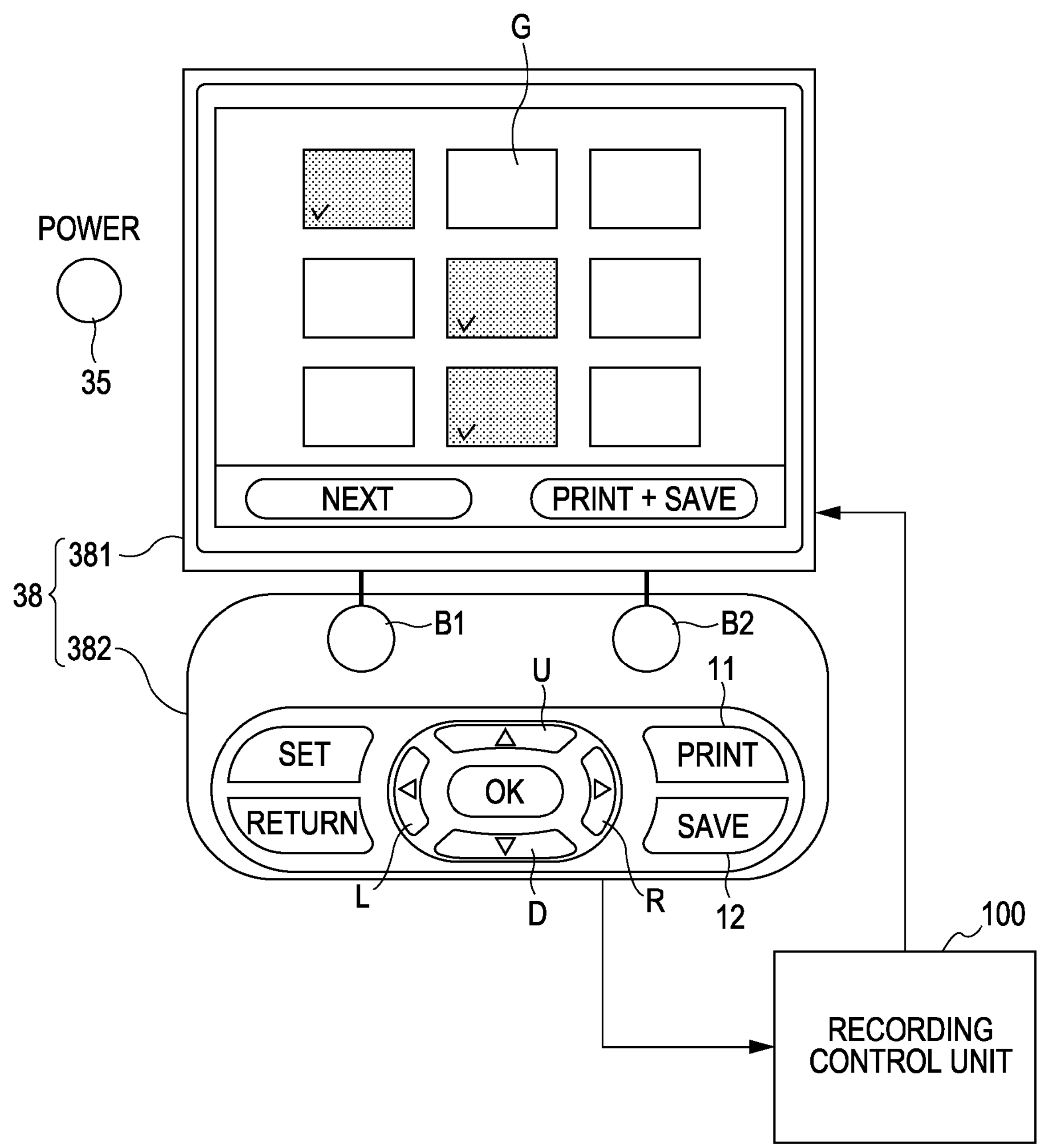
FIG. 10 illustrates a user interface according to a fourth embodiment of the invention.

FIG. 10 is a plan view of a user interface 38 according to a fourth embodiment of the invention.

Instead of providing the "PRINT+SAVE" button 14 in the form of a hardware mechanism as in the third embodiment, the "print+save" operation may be assigned to a function key whose function can be arbitrarily set by a program. In the fourth embodiment, when a button B2, which is arranged as a function key in the user interface 38, is pressed, both the process of recording the images of the desired digital image files selected by the user on the recording sheets P and the process of storing the desired digital image files in the optical disc 302 are performed.

In addition, when a function key whose function can be arbitrarily set is used, the function key may be used as an operation button for sequentially performing two or more operations selected from the operation for executing the process of recoding the images of the arbitrarily selected digital image files on the recording sheets P, the operation for executing the process of storing the selected digital image files in the optical disc 302 using the CD/DVD drive 37, and other operations for executing controls based on other kinds of functions of the ink jet recording apparatus 50. For example, if the ink jet recording apparatus 50 is connectable to the Internet, the user can transmit the arbitrarily selected digital image files together with an e-mail. In the ink jet recording apparatus 50 having such a function, a button B1 or B2 may be used as a function key for performing both the operation for recording the images of the arbitrarily selected digital image files on the recording sheets P and the operation for transmitting the selected digital image files together with an e-mail.

The invention is not limited to the above-described embodiment, and various modifications are possible within the scope of the invention. Such modifications are, of course, included in the scope of the invention.

What is claimed is:

1. A recording apparatus which is connectable to an Internet, the recording apparatus comprising:

a recording unit capable of recording an image on a recording medium;

a file input device capable of receiving a file;

external storage unit capable of reading and writing a digital image file onto a removable storage medium;

a user interface; and a recording control device that performs file input control through the file input device, control of the external storage unit, recording control for causing the recording unit to record the image on a recording medium, and user interface control through the user interface, wherein the recording control device has:

a record execution operation input function that allows a record execution operation to be performed through the user interface, the record execution operation being performed to execute the recording control for causing the recording unit to record an image of an arbitrarily selected digital image file on a recording medium;

a save execution operation input function that allows a save execution operation to be performed through the user interface, the save execution operation being performed to execute file save control for causing the external storage unit to store the arbitrarily selected digital image file on the removable storage medium;

a record/save execution operation input function that allows the record execution operation and the save execution operation to be sequentially performed through the user interface, the record execution operation and the save execution operation being performed to execute the recording control for causing the recording unit to record the image of the arbitrarily selected digital image file on the recording medium and the file save control for causing the external storage unit to store the arbitrarily selected digital image file on the removable storage medium;

an email transmittal execution operation input function that allows an email transmittal operation to be performed through the user interface, the email transmittal operation being performed to transmit the arbitrarily selected digital image file in an email though the Internet; and a record/email transmittal execution operation input function that allows the record execution operation and the email transmittal operation to be sequentially performed through the user interface, the record execution operation and the save execution operation being performed to execute the recording control for causing the recording unit to record the image of the arbitrarily selected digital image file on the recording medium and the email transmittal operation being performed to transmit the arbitrarily selected digital image file in an email though the Internet, wherein, when the record execution operation for executing the recording control for causing the recording unit to record the image of the arbitrarily selected digital image file on the recording medium and the save execution operation for executing the file save control for causing the external storage unit to store the arbitrarily selected digital image file in the removable storage medium are sequentially performed, the order in which the recording control and the file save control are executed is arbitrarily selectable through the user interface, and wherein the order in which the recording control for recording the images on the recording sheets and the file save control for storing the digital image file are performed when the record execution operation and the save execution operation are sequentially performed may be selected depending on whether the record execution operation input function or save execution operation was selected first in the user interface.

2. The recording apparatus according to claim 1, wherein the user interface includes, a record execution operation input unit by which the record execution operation is performed to execute the recording control for causing the recording unit to record the image on the recording medium;

a save execution operation input unit by which the save execution operation is performed to execute the file save control for causing the external storage unit to store the digital image file in the removable storage medium; and a record/save execution operation input unit by which the record execution operation and the save execution operation are sequentially performed to execute the recording control for causing the recording unit to record the image on the recording medium and the file save control for causing the external storage unit to store the digital image file in the removable storage medium.

3. The recording apparatus according to claim 1, wherein the recording control device has a composite processing operation input function that allows two or more operations to be performed through the user interface, the two or more operations being selected from the record execution operation performed to execute the recording control for causing the recording unit to record the image of the arbitrarily selected digital image file on the recording medium, the save execution operation performed to execute the file save control for causing the external storage unit to store the arbitrarily selected digital image file in the removable storage medium, and an operation performed to execute control based on another function of the recording apparatus.

4. A recording control program comprising a series of computer-executable instructions stored in a non-transitory computer-readable storage medium, the recording control program for a recording apparatus which is connectable to an Internet includes a recording unit capable of recording an image on a recording medium; a file input device capable of receiving a file; an external storage unit capable of reading and writing a digital image file to a removable storage medium; and a user interface, where executing the recording control program causes a computer to perform file input control through the file input device, control of the external storage unit, recording control for causing the recording unit to record an image on the removable recording medium, and user interface control through the user interface, the program implementing:

a record execution operation input function that allows a record execution operation to be performed through the user interface, the record execution operation being performed to execute the recording control for causing the recording unit to record the image of an arbitrarily selected digital image file on a recording medium;

a save-execution operation input function that allows a save execution operation to be performed through the user interface, the save execution operation being performed to execute file save control for causing the external storage unit to store the arbitrarily selected digital image file on the removable storage medium;

a record/save execution operation input function that allows the record execution operation and the save execution operation to be sequentially performed through the user interface, the record execution operation and the save execution operation being performed to execute the recording control for causing the recording unit to record the image of the arbitrarily selected digital image file on the recording medium and the file save control for causing the external storage unit to store the arbitrarily selected digital image file on the removable storage medium;

an email transmittal execution operation input function that allows an email transmittal operation to be performed through the user interface, the email transmittal operation being performed to transmit the arbitrarily selected digital image file in an email though the Internet; and a record/email transmittal execution operation input function that allows the record execution operation and the email transmittal operation to be sequentially performed through the user interface, the record execution operation and the save execution operation being performed to execute the recording control for causing the recording unit to record the image of the arbitrarily selected digital image file on the recording medium and the email transmittal operation being performed to transmit the arbitrarily selected digital image file in an email though the Internet, wherein, when the record execution operation for executing the recording control for causing the recording unit to record the image of the arbitrarily selected digital image file on the recording medium and the save execution operation for executing the file save control for causing the external storage unit to store the arbitrarily selected digital image file in the removable storage medium are sequentially performed, the order in which the recording control and the file save control are executed is arbitrarily selectable through the user interface, and wherein the order in which the recording control for recording the images on the recording sheets and the file save control for storing the digital image file are performed when the record execution operation and the save execution operation are sequentially performed may be selected depending on whether the record execution operation input function or save execution operation was selected first in the user interface.

* * * * *